Figure 2:
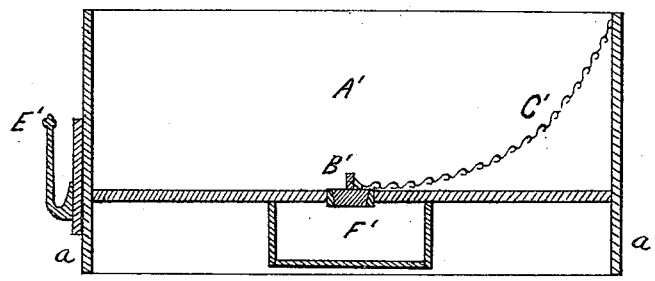

(No Model.)

C. A. BERGTOLD.
VESSEL FOR FRESHENING AND REPICKLING FISH.

No. 250,776. Patented Dec. 13, 1881.

WITNESSES.

INVENTOR.

Chas A. Bergtold

UNITED STATES PATENT OFFICE.

CHARLES A. BERGTOLD, OF NEW YORK, N. Y.

VESSEL FOR FRESHENING AND REPICKLING FISH.

SPECIFICATION forming part of Letters Patent No. 250,776, dated December 13, 1881.

Application filed November 4, 1881. (No model.)

*To all whom it may concern:*

Be it known that I, CHARLES A. BERGTOLD, of the city, county, and State of New York, have invented a new and Improved Freshening and Repickling Pan or Tub; and I hereby declare the following to be such a full, clear, and exact description of my invention as will enable any one skilled in the art to make and use the same, reference being had to the accompanying drawings, making part of this specification, and to the letters and figures of reference marked thereon.

The object of my invention is to produce a pan or tub in which fish may be partially or wholly freshened and repickled without being removed from the pan or rehandled.

It is the custom among retail grocers and fishmen to keep a few salt fish in soak in a pan or tub of fresh water for the purpose of partially freshening them, that they may be ready for instant use. The fish thus treated, if not sold in a few hours, will spoil and entail a loss upon the dealer unless repickled. The usual course is to have an extra pan or tub in which to repickle the partially-freshened fish, or to let them spoil and bear the loss rather than handle the stock again.

By my invention I combine, with a suitable pan or tub for freshening fish, a convenient and economical means of repickling them, while at the same time I obviate the necessity of the rehandling and the use of extra pans or tubs for the repickling process, besides economizing in the use of salt, and rendering the repickling so simple and economical that but few, if any, fish will be wasted.

My invention consists of a suitable pan or tub having its sides projecting below its bottom, say, one-third the depth of the sides, combined with a salt chamber or pocket extending downward from the bottom of the pan or tub until its bottom is flush, or nearly so, with the projecting sides of the pan or tub, and connected with the same by means of a tube or opening which can be tightly closed, when desired, by means of a stopper or plug, and all communication between the pan and salt chamber or pocket cut off. The stopper or plug is attached to a small chain, or its equivalent, which is fastened to the top rim of the pan or tub, and may be removed from the opening connecting the pan and the salt-chamber without putting one's hands in the water.

In using my improved pan or tub the salt chamber or pocket is first filled with salt and the stopper or plug carefully fitted in its place, after which the fresh water and fish are put in the pan and left until the fish is disposed of, or is too fresh and likely to spoil, when the stopper can be removed by means of the chain and connection made between the water pan or tray and the salt chamber or pocket, allowing the water to descend and act upon the salt and to take up as much as it will hold in solution, making a brine or pickle strong enough to repickle and preserve the fish, while the surplus salt is left in the salt chamber or pocket and may be used for another pan of fish; for by replacing the stopper the brine used to repickle the first mess of fish can be poured off and fresh water put in the freshening-pan, and, if necessary, the repickling process gone through with again and again until all of the salt is actually used up and none wasted.

Figure 1:
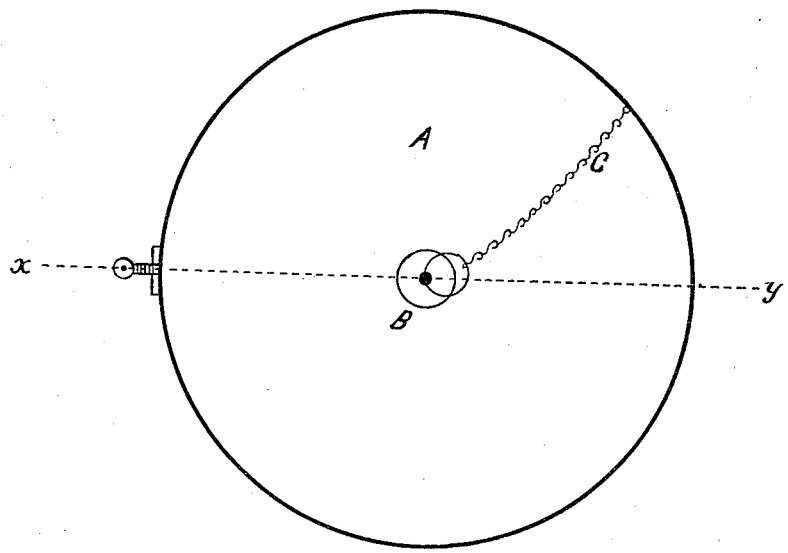

Referring to the drawings, Figure 1 is a top view of my invention, and Fig. 2 a cross-section of the same through the dotted line $x\ y$.

In Fig. 1, A indicates the pan or tub; B, the stopper which closes the opening between the pan and the salt-chamber F', Fig. 2; C, the chain attached to the stopper, as described; and E, a hook made on the side of the pan on which to hang a towel, or a hook suitable for removing the fish from the pan.

In Fig. 2, A' is the water pan or tray. F' is the salt chamber or pocket; B', the stopper or plug; $a\ a$, the sides of the pan projecting below its bottom; C', the chain attached to the stopper, and E' the hook on the side of the pan or tub. The object in having the sides $a\ a$ project below the bottom of the pan is to protect the salt-chamber from injury and to steady the freshening-pan as a whole when resting upon a flat surface, and also, if made large enough to fit over the head or top rim of a fish keg or barrel, to guard against its being displaced or upset.

I do not intend to limit my invention to a pan or tub for freshening fish, as it can be used for freshening and repickling many things.

Having described my invention, I claim and desire to secure by Letters Patent—

A freshening and repickling tub consisting of the combination of a pan or tub with a salt chamber or pocket attached to the bottom of the pan or tub, and connected with the same by means of an opening or tube fitted with a stopper, and having a flange or rim, *a a*, extending below the bottom of the pan, for the purpose of protecting the salt-chamber and holding the pan upon a barrel or cask, substantially as described.

CHAS. A. BERGTOLD.

Witnesses:
WM. H. BROADNAX,
J. EDGAR BULL.